United States Patent [19]
Mukai et al.

[11] Patent Number: 5,193,422
[45] Date of Patent: Mar. 16, 1993

[54] MULTISPINDLE AUTOMATIC LATHE

[75] Inventors: Yuuichi Mukai; Yoshitoshi Ito; Takayuki Nagato; Tamotsu Tonomura, all of Hiroshima, Japan

[73] Assignee: Mitsubishi Jukogyo Kabushiki Kaisha, Tokyo, Japan

[21] Appl. No.: 786,070

[22] Filed: Oct. 31, 1991

[30] Foreign Application Priority Data

Nov. 16, 1990 [JP] Japan .................... 2-119348
May 14, 1991 [JP] Japan .................... 3-33680

[51] Int. Cl.⁵ ............................... B23B 9/04
[52] U.S. Cl. ............................ 82/129; 29/38 B
[58] Field of Search ............. 82/129, 118, 119, 120; 29/38 A, 38 B

[56] References Cited

U.S. PATENT DOCUMENTS

| | | | |
|---|---|---|---|
| 3,364,788 | 1/1968 | Schubert | 82/129 X |
| 3,535,962 | 10/1970 | Ledergerber | 82/129 |
| 3,643,307 | 2/1972 | Ledergerber et al. | 82/129 X |
| 3,693,485 | 9/1972 | Maurer | 82/129 X |
| 3,718,211 | 2/1973 | Schubert et al. | 82/129 X |
| 3,744,355 | 7/1973 | Flisch | 82/129 |
| 3,747,444 | 7/1973 | Schubert | 82/129 X |
| 3,798,720 | 3/1974 | Ledergerber et al. | 82/129 X |
| 4,253,359 | 3/1981 | Youden | 82/118 X |
| 4,642,861 | 2/1987 | Riley et al. | 29/38 A |
| 4,779,318 | 10/1988 | Henderson | 29/38 B |

FOREIGN PATENT DOCUMENTS 1312474 11/1962 France .................... 82/129

Primary Examiner—Z. R. Bilinsky
Attorney, Agent, or Firm—Jacobson, Price, Holman & Stern

[57] ABSTRACT

A multispindle automatic lathe has a main shaft drive motor (M3) for driving spindles (13) via a driving power transmission system (2a, 12, 14, 15, 20, 21, 22, 27, 28, 31), a feed and index driving motor (M2) operating a low and high speeds in timed sequence for feeding a plurality of cross tool slides (16) via a feed driving system (3a, 61, 62, 64, 65, 67, 68, 69, 70) and indexing the spindle carrier (11) via an index driving system (62, 71, 72, 73, 74, 75, 76, 77), and a feed and index drive motor (M1) for feeding a plurality of end tool slides (18) via a feed driving system (4a, 18a, 78, 79). A ring gear (65) is disposed around and in an independently rotatable form separate from the spindle carrier (11), a cam shaft (68) for each cross tool slide has mounted thereon a gear (70) engaging the ring gear (65) and a cam (69), and a cam roller (67) is disposed on each cross tool slide (16) and engages with the cam surface of a respective cam, whereby rotation of the cams by the feed driving system reciprocates the cross tool slides in directions transverse to the spindle shaft. An index gear (77) on the spindle carrier is rotated in timed sequence with the cross tool slides by the feed and index drive motor.

6 Claims, 7 Drawing Sheets

MULTISPINDLE AUTOMATIC LATHE

BACKGROUND OF THE INVENTION

This invention relates to a multispindle automatic lathe on which the gear trains for drive and feed systems are simplified and the main drum shaft (cam driving shaft) does not traverse between the gearbox and headstock.

When rod-shaped workpieces are machined continuously by using a plurality of cutting tools of different types, commonly used is a multispindle automatic lathe which rotates to index a spindle carrier carrying three to eight spindles for supporting the workpieces arranged in the same circumference at fixed intervals and which revolves to change the position of the spindles to carry out machining sequentially.

FIG. 6 is a partial sectional view of the spindle carrier of a conventional multispindle automatic lathe. As shown in FIG. 6, a spindle carrier 11 has a driving shaft 12 at its center, and a turning torque is given to this driving shaft 12 by a motor shown in FIG. 7. On the spindle carrier 11, a plurality of spindles 13 are pivotally carried at equal intervals in a concentric relation with the center of driving shaft 12. A gear 15 fixed to each spindle 13 engages with a gear 14 fixed to the driving shaft 12, so that the spindles 13 rotate simultaneously by the rotation of the driving shaft 12.

A workpiece W is supported by passing through the bore of each spindle 13 and rotates along with the rotation of the spindle 13. It is machined by a tool 17 carried on a cross tool slide 16 which moves in the direction perpendicular to the driving shaft 12 (the up and down direction in FIG. 6) and by a tool 19 carried on an end tool slide 18 which moves in the direction parallel to the driving shaft 12 (the right and left direction in FIG. 6).

The cross tool slide 16 and the end tool slide 18 are installed in plural numbers corresponding to the positions of the spindles 13. Workpieces on different spindles 13 simultaneously undergo different machining with these tools 17, 19. When the spindle carrier 11 rotates for indexing around the driving shaft 12, each spindle 13 revolves and changes its position in relation to the tools, so that each workpiece W is machined sequentially in a different manner until the workpiece is finished.

On this multispindle automatic lathe, the rotation of the spindle 13 and the feed of the cross tool slide 16 and the end tool slide 18 are performed by the transmission of power by means of gear trains shown in FIG. 7.

Specifically, the rotation of the motor 1 at a fixed speed is transmitted to a pulley shaft 31 via a belt 20 and pulleys 21,22. The rotation is then transmitted to the driving shaft 12 via a first meshing of gears 23 and 24, a second meshing of gears 25 and 26, and a third meshing of gears 27 and 28. The rotation of the driving shaft 12 is transmitted to a plurality of spindles via the meshing of gears 14 and 15. Thus, the spindle 13 rotates at a fixed speed by the motor 1 via many gears 23, 24, 25, 26, 27, 28.

Meanwhile, the rotation of the pulley shaft 31 is transmitted to a transmission shaft 43 via the meshing of bevel gears 35 and 36 so that the transmission shaft rotates at a high speed, or it is transmitted to transmission shaft 43 via the meshing of a gear 38 and a gear 37 which is mounted on the same shaft as gear 26, and that of gears 39 and 40, and that of a worm 41 and a worm wheel 42 so that the transmission shaft 43 rotates at a low speed.

A change from the power transmission by the bevel gear 36 to that by the worm wheel 42 and vice versa can be performed by means of a clutch 44 installed between the bevel gear 36 and the transmission shaft 43 and a clutch 45 installed between the worm wheel 42 and the transmission shaft 43.

The meshing of a worm 50 installed on the transmission shaft and a worm wheel 51 installed on a cam drum shaft also called a main drum shaft) 4 allows the cam drum shaft 4 to rotate at a reduced speed; as a result, a drum shaft 57 is rotated by the meshing of gears 52 and 53, and a cross drive shaft 58 is rotated by the meshing of gears 54, 55 and 56.

The rotation of the cross drive shaft 58 moves the above-mentioned cross tool slide 16 to produce, for example, the feed action of the tool 17 in the radial direction. The cam drum shaft 4 has a cylindrical cam 59 thereon, the rotation of which moves the above-mentioned end tool slide 18 to produce, for example, the feed action of the tool 19 in the axial direction.

The rotational speed of the spindle 13 is changed by changing the gear ratio; namely, by changing the combination of meshing gears of a spindle change gear 5 composed of the gears 25 and 26 and other gears not shown. The feed speed of the cross tool slide 16 is changed by changing the gear ratio; namely, by changing the combination of the meshing gears in a feed change gear set 6 composed of the gears 37 and 38 and other gears not shown or by changing the power transmission through the clutches 44 and 45.

Thus, the cutting conditions are changed by changing the gear ratio of the spindle change gear 5 and that of the feed change gear 6.

The multispindle automatic lathe using the conventional driving mechanism shown in FIG. 7, however, has some disadvantages.

To obtain the necessary rotational speed of spindles and the feed drive speed after the machining conditions are decided, the meshing of gears must be changed by determining the gear ratio of the spindle change gear 5 and the feed change gear 6. Therefore, the troublesome work of determining gear ratio and changing gear meshing is needed every time the machining conditions are changed.

Because the machining conditions are decided by the change gears 5 and 6, the rotational speed is limited by the combination of the number of gear teeth of these gears, so that proper machining conditions cannot be set freely, though the machining conditions can be selected to some degree.

The large-diameter cylindrical cam 59, which controls the movement of the end tool slide, requires much time in manufacturing and is difficult to handle because of its weight.

For the conventional driving mechanism, the cam drum shaft 4 is required which extends from a gearbox 101 to a headstock 102 (FIG. 8) incorporating the spindle carrier 11 and others because one motor 1 within the gearbox 101 performs all operations of driving the system. In this case, the cam drum shaft 4 lies under a tooling zone T, so that chips discharged from the upper portion are caught by the cam drum shaft 4, which disturbs the discharge of chips and sometimes requires stopping the machine to remove chips from the cam drum shaft.

Since the conventional driving mechanism has such a construction that the power is transmitted via many stages of gear trains, the number of parts of the machine itself is many, and it takes much time to assemble the machine, posing problems of high cost and low productivity.

BRIEF SUMMARY OF THE INVENTION

It is an object of the present invention is to provide a multispindle automatic lathe which eliminates the above-described disadvantages.

To solve the above problems, according to this invention there is provided in a multispindle automatic lathe having a spindle carrier which is mounted rotatably in relation to a headstock for indexing, a plurality of spindles which are rotatably attached around the center of index rotation of the spindle carrier and to each of which a workpiece is mounted, a cross tool slide which is disposed near the periphery of the spindle carrier in correspondence to each spindle and which can move back and forth in the direction crossing the spindle axis and to which a tool for machining the workpiece is mounted, and an end tool slide which can move back and forth in the direction parallel to the spindle axis and to which a tool for machining the workpiece is mounted.

In the invention, the following features are included: a main shaft driving motor for driving the spindles via a driving power transmission system; a feed and index driving motor for feeding the cross tool slide via a feed driving system and indexing the spindle carrier via an index driving system; and a feed driving motor for feeding the end tool slide via a feed driving system.

According to this invention, there is provided in a multispindle automatic lathe having a spindle carrier which is mounted rotatably in relation to a headstock for indexing, a plurality of spindles which are rotatably attached around the center of index rotation of the spindle carrier and to each of which a workpiece is mounted, a cross tool slide which is disposed near the periphery of the spindle carrier in correspondence to the spindle and can move back and forth in the direction crossing the spindle axis and to which a tool for machining the workpiece can be mounted, and an end tool slide which can move back and forth in the direction parallel to the spindle axis and to which a tool for machining the workpiece can be mounted, the improvement including a ring gear which is disposed around the spindle carrier and supported in an independently rotatable manner separately from the spindle carrier, a cam shaft which has a gear engaging the ring gear and a cam on the same shaft, and a cam roller which is disposed on the cross tool slide and engages with the cam surface of the cam, whereby the rotation of the cam may cause the cross tool slide to slide in the direction perpendicular to the spindle shaft, and the ring gear can be driven and rotated by the index driving motor for indexing and driving the spindle carrier.

On the multispindle automatic lathe with the above-described configurations, the driven rotation of the spindle, the feed of the cross tool slide and the index rotation of spindle carrier, and the feed of the end tool slide are performed by means of respective special-purpose motors. Therefore, the use of adjustable speed motors eliminates the need for gear changes; when speed commands are sent to each system, the necessary rotational speed can be inputted by key operations on the control board. It is also unnecessary to install the cam drum shaft for transmitting power in the tooling zone.

In the operational aspect of the multispindle automatic lathe according to this invention, the time for changing gears becomes unnecessary and the machining conditions can be changed on the control board in a short time without dirty work. In the functional aspect, rotational speed can be selected without steps as compared with gears which are constrained by given rotation ratios. In the performance aspect, the gear trains become simplified, and the work environment is improved by the reduction in gear noise. Further in the economical aspect, the number of parts can be decreased, the man-hours for machining and assembling are reduced, and the large cylindrical cam becomes unnecessary. Therefore, the lathe of this invention is advantageous in reducing cost and man-hours. Moreover, because the driving shaft is not installed in the tooling zone, chips discharged from the upper portion fall into a chip receiver without being caught by the driving shaft, so that it is almost unnecessary to stop the machine to dispose of chips.

BRIEF DESCRIPTION OF THE DRAWINGS

The invention will now be described in detail with reference to the accompanying drawings wherein.

DETAILED DESCRIPTION OF PREFERRED EMBODIMENT

Figure 7:
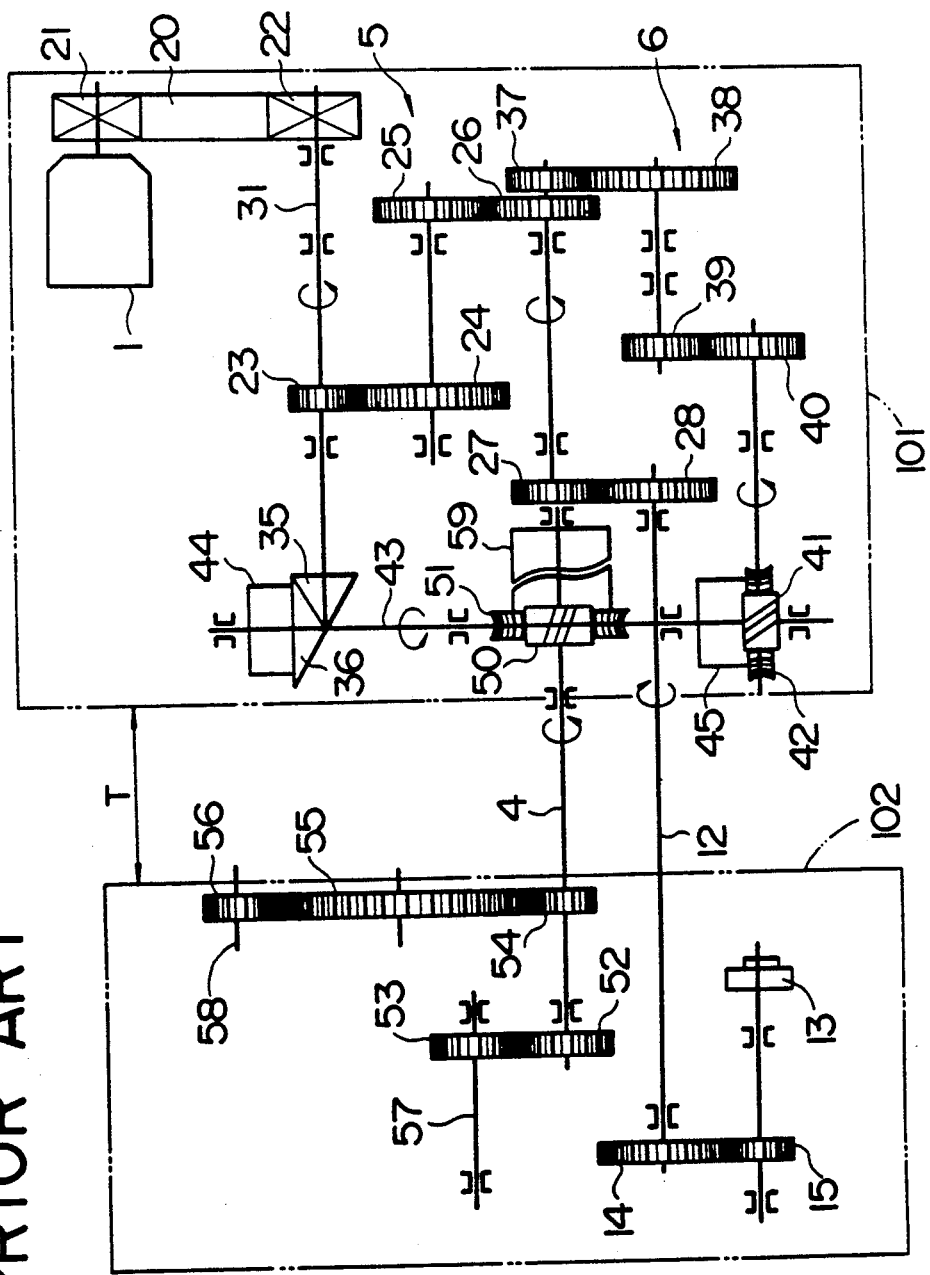
FIG. 7 is a schematic view of the gear trains showing conventional feed and drive systems.
Figure 8:
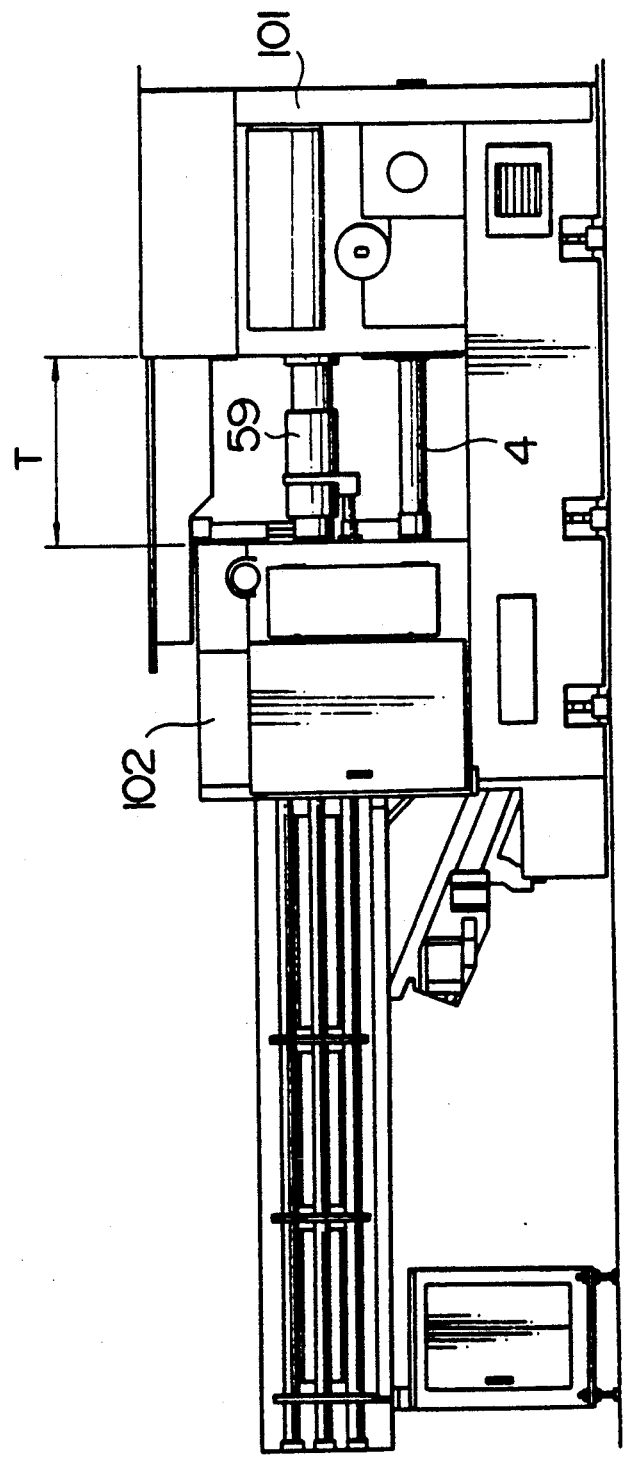
FIG. 8 is a side elevational view of a conventional multispindle automatic lathe.

One embodiment of the multispindle automatic lathe according to this invention will be described by reference to FIGS. 1 through 5. The reference numerals in these figures designate like or corresponding conventional parts in FIG. 7.

Figure 1:
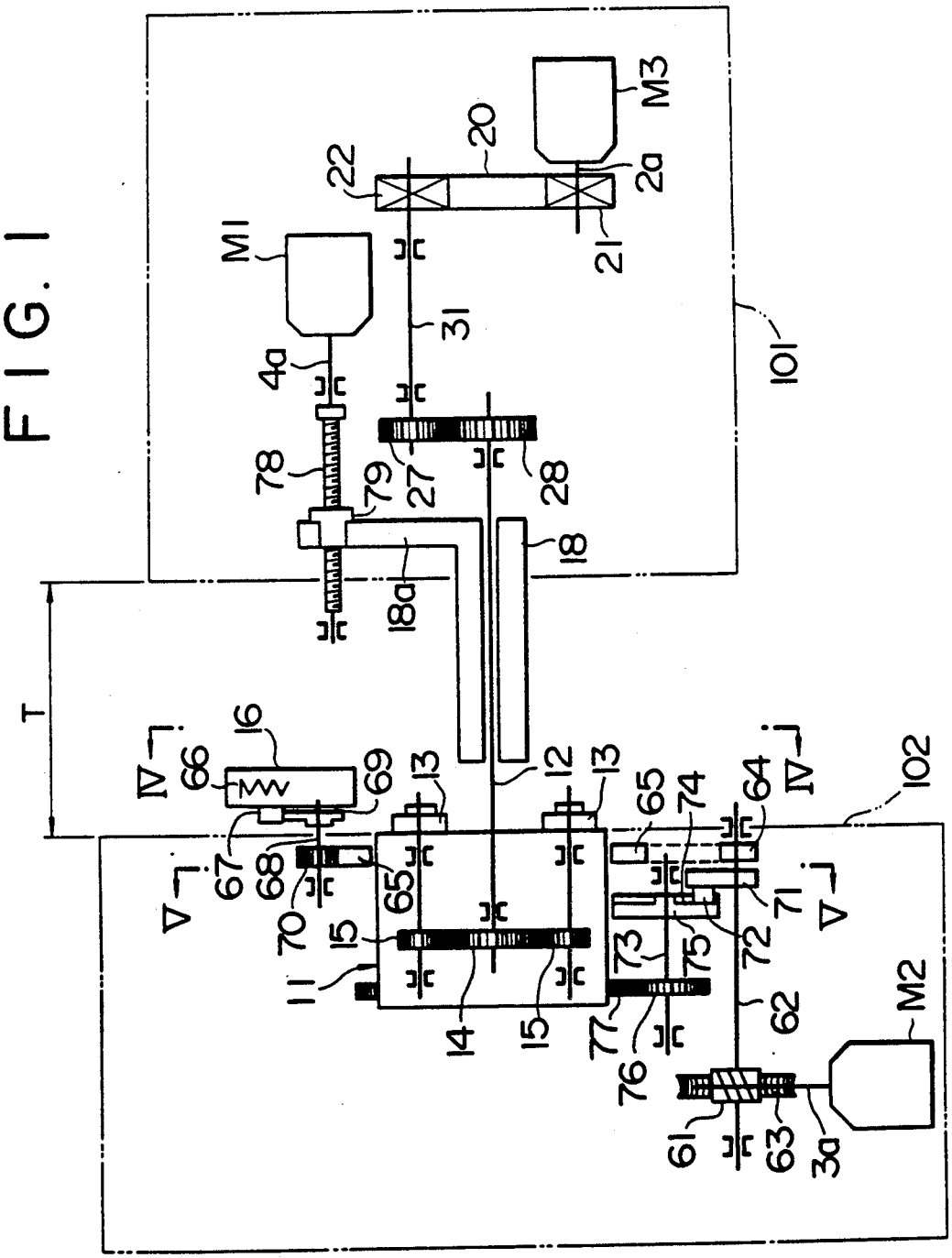
FIG. 1 is a schematic view showing the feed and drive systems of one embodiment of the multispindle automatic lathe according to this invention.
Figure 2:
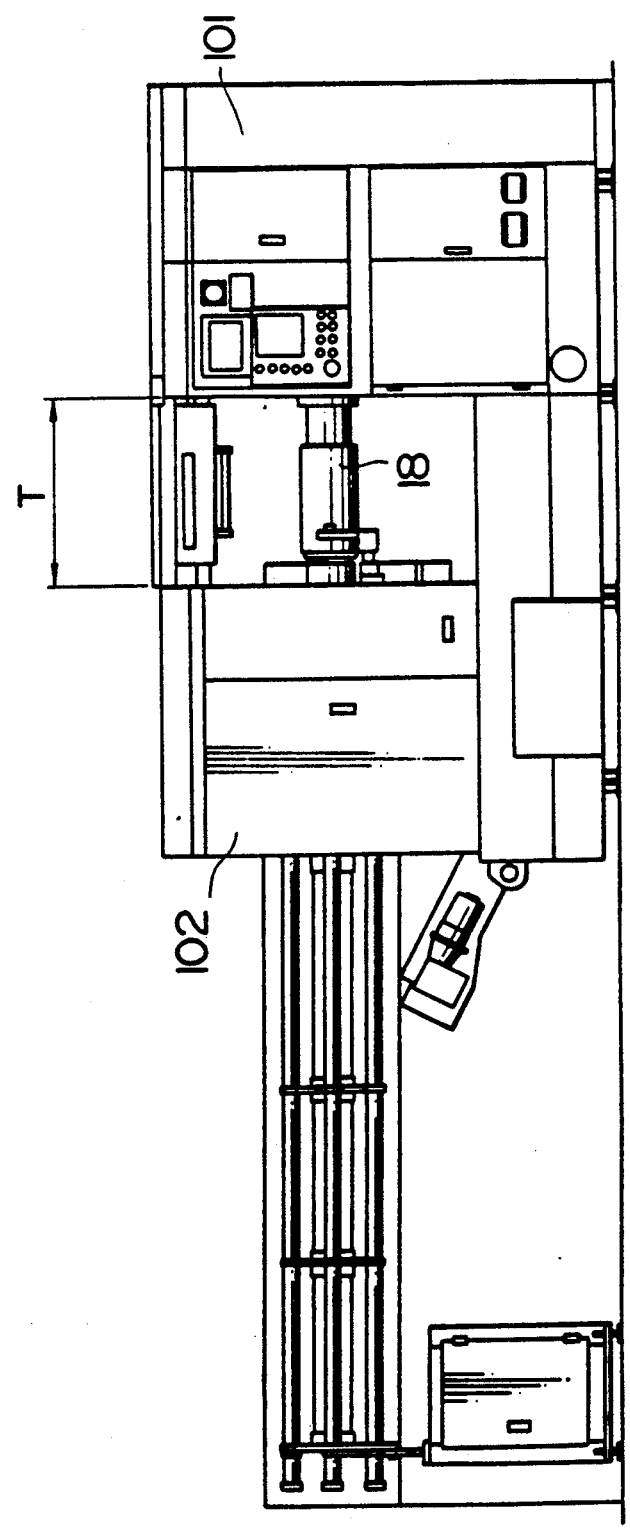
FIG. 2 is a side elevational view of one embodiment of the multispindle automatic lathe according to this invention.

Referring to FIG. 1 showing the entire gear train in this embodiment, M3 indicates a main shaft driving motor assembled into a gearbox 101, on the rotating shaft 2a of which is installed a pulley 21. On a pulley shaft 31 which is parallel to the rotating shaft 2a, also installed is a pulley 22. A belt 20 is place and bent around these pulleys 21 and 22, so that the driving power of the motor M3 is transmitted to the pulley shaft 31.

Figure 6:
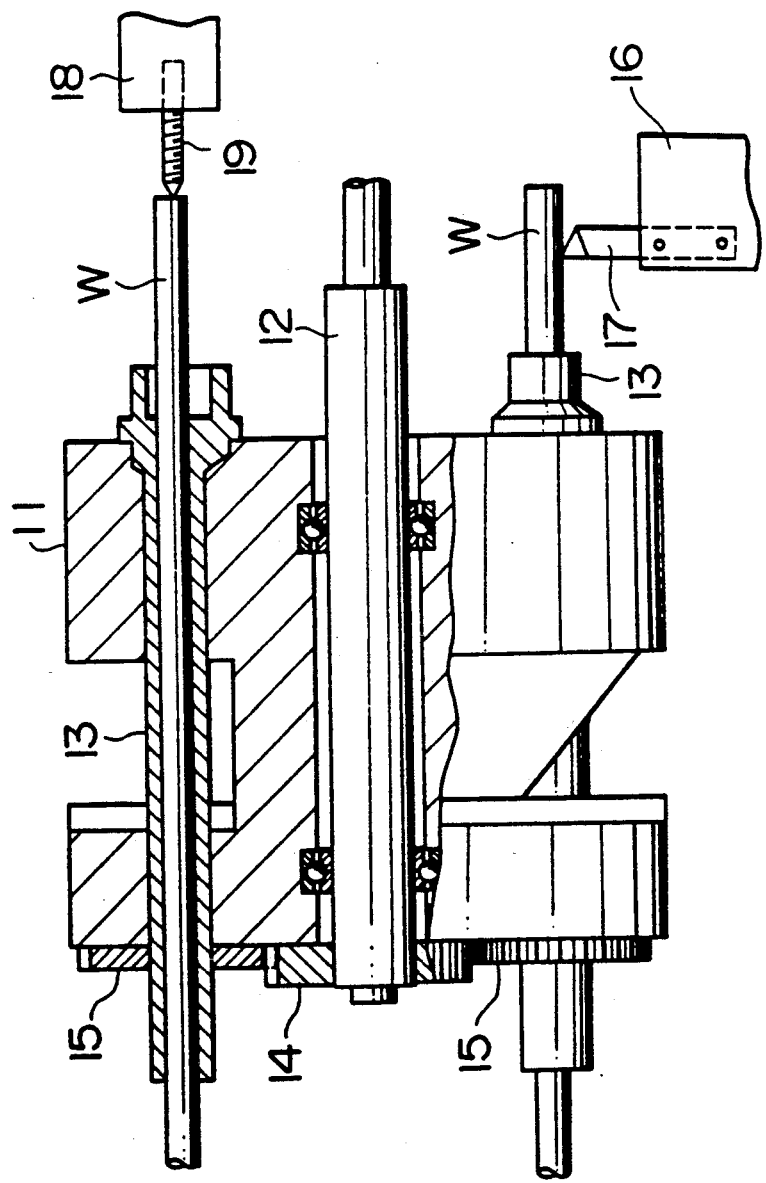
FIG. 6 is a cross-sectional view of the spindle carrier of a multispindle automatic lathe.

A change gear 27 is fixed to the pulley shaft 31, and a change gear 28 meshing with the change gear 27 is fixed to a driving shaft 12 (see FIG. 6) which is parallel to the pulley shaft 31.

A spindle carrier 11 is carried on a headstock 102. To the driving shaft 12 extending through the spindle carrier 11 fixed is a spindle drive gear 14, which engages with a spindle gear 15 fixed to each spindle 13. Therefore, six spindles 13 are rotated simultaneously by the rotation of motor M3 via the pulley shaft 31 and the driving shaft 12.

M2 is a feed and index driving motor assembled into a headstock 102, on the rotating shaft 3a of which is installed a worm 61. A worm wheel 63 engaging with the worm 61 is fixed to a cam drum shaft 62 which is parallel to the driving shaft 12. Therefore, the driving power of motor M2 is transmitted to the cam drum shaft 62 via the worm 61 and the worm wheel 63.

A drive gear 64 is fixed to the cam drum shaft 62. A ring gear 65 is installed around the spindle carrier 11 in such a manner as to rotate in relation to the spindle carrier 11. The drive gear 64 engages with this ring gear 65.

Figure 4:
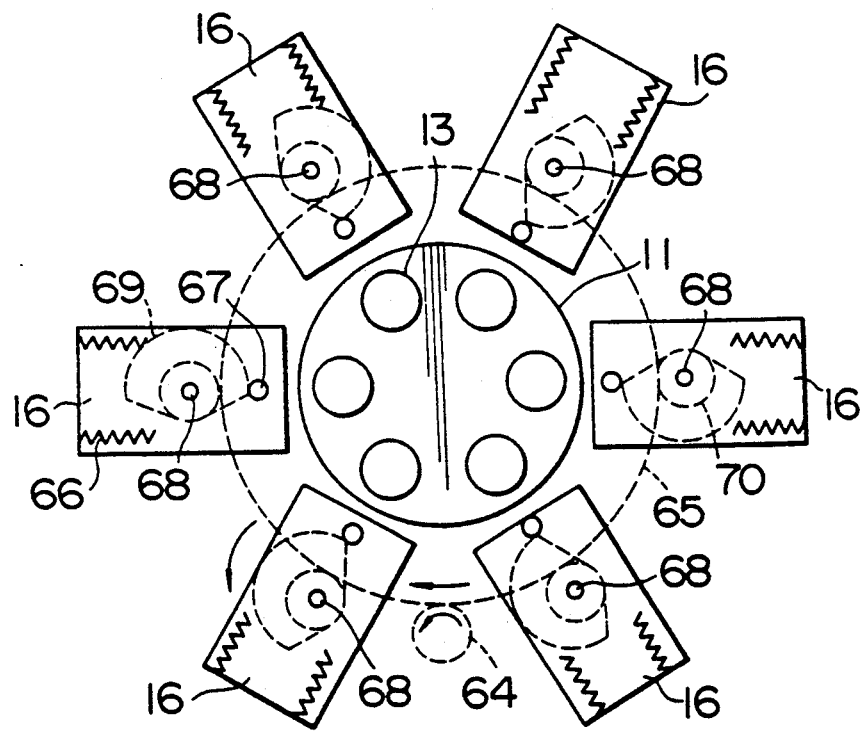
FIG. 4 is a schematic cross-sectional view taken along line IV—IV in FIG. 1.

As shown in FIG. 1 and also in FIG. 4 showing the cross section taken along the plane of line IV—IV, the cross tool slides 16 are installed on the headstock 102 supporting the spindle carrier 11 in such a manner as to move back and forth by being guided in the radial direction. In this embodiment, six cross tool slides 16 are installed at equal intervals. The cross tool slide has a tool 17 such as a cutting tool. On the tip side of each cross tool slide 16, a cam roller 67 is installed.

On the headstock 102, a cam shaft 68 is supported corresponding to each cross tool slide. Each cam shaft 68 has a cam 69 thereon whose cam face engages with the cam roller 67.

On the cross tool spindle 16, a spring applies a pressuring force so that the cam roller 67 remains in contact with the cam face 69 all the time. Fixed to each cam shaft 68 is a cam drive gear 70, which engages with the ring gear 65.

Therefore, when the cam 69 makes one turn together with the cam drive gear 70 by means of the feed and index driving motor M2 via the worm 61 and the worm wheel 63 and the cam drive 62 and the drive gear 64 and the ring gear 65, the cross tool slide 16 performs one reciprocating motion in the radial direction.

Figure 5:
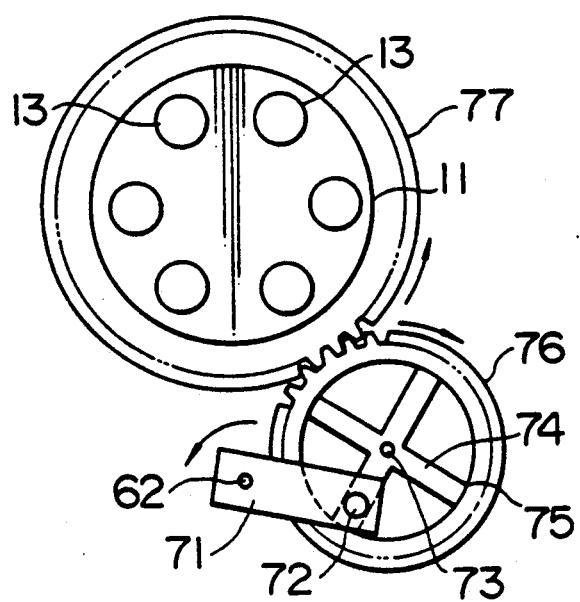
FIG. 5 is a schematic cross-sectional view taken along line V—V in FIG. 1.

As shown in FIG. 1 and also in FIG. 5 showing the cross section taken along the plane of line V—V, a revolving arm 71 is fixed to the cam drum shaft 62. At the end of the revolving arm installed is a cam roller 72. An index disk 75 having a cross groove 74 is mounted to an intermediate shaft 73 which is parallel to the cam drum shaft 62, and the cam roller 72 at the end of the revolving arm 71 movably engages with the cross groove 74 on the index disk 75. To the intermediate shaft 73 is fixed an index drive gear 76 which engages with an index gear 77 installed integrally around the spindle carrier 11.

When the cam drum shaft 62 is rotated one turn by the feed and index driving motor M2, the revolving arm 71 is revolved one turn, whereby the index disk 75 is rotated by a quarter turn via the engagement of the cam roller 72 with the cross groove 74. Therefore, the index drive gear 76 is also rotated a quarter turn since it is fixed to the same shaft as that of the index disk 75. Since the gear ratio between the index drive gear 76 and the index gear 77 is 1:1.5, the index gear 77 rotates by $\frac{1}{4} \times 1/1.5 = 1/6$ turn. This means that one turn of the cam drum shaft 62 rotates the spindle carrier 11 by a fraction of one turn corresponding to the inverse of the number of the spindles (i.e., an index rotation of 60° in this case).

The end tool slide 18 is movably carried in the axial direction on the extension of the centerline of the spindle carrier 11. At the center of the end tool slide 18, the driving shaft 12 passes through the spindle carrier 11. M1 indicates a driving motor, the driving shaft 4a of which is directly connected to a ball screw shaft 78. A ball nut 79 engaging with this ball screw shaft 78 is assembled to an arm portion 18a which is integral with the end tool slide 18.

With this arrangement, the end tool slide 18 reciprocates in the direction parallel to the axis of the spindle carrier 11 by means of the driving power from the feed driving motor M1 via the ball screw. As described above, a tool 19, such as a drill, is mounted on the end tool slide 18.

Next, the operation of this multispindle automatic lathe will be described specifically.

Figure 3:
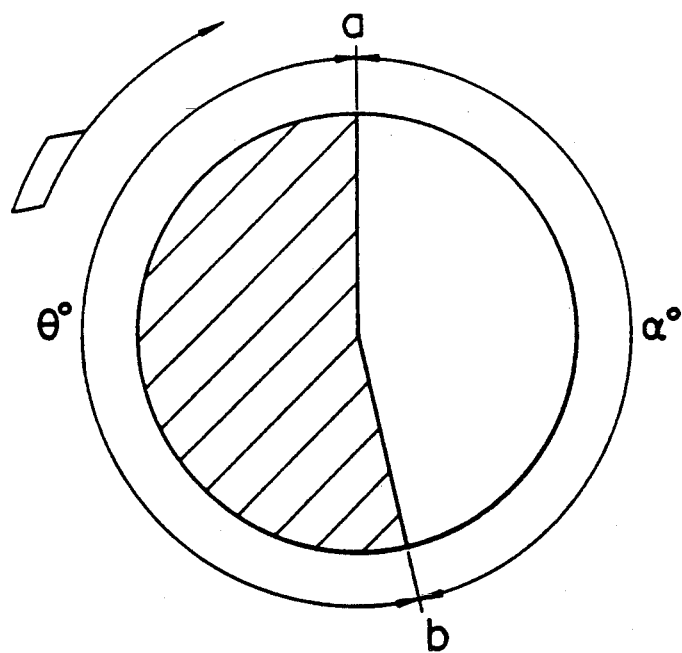
FIG. 3 is a cross-sectional view for explaining one cycle action of the cam drum.

This multispindle automatic lathe, like the conventional one, completes one cycle when the cam drum shaft 62 rotates one turn. FIG. 3 shows one cycle action of the cam drum shaft 62.

The cam drum shaft 62 is rotated by the feed and index driving motor M2, for example, from point a at a low speed. During this time, the cross tool slide 16 advances, so that the turning of workpiece W is performed by the tool 17. When the cam drum shaft 62 rotates by $\alpha$ degrees from point a to point b, an instruction for high speed is given to the feed and index driving motor M2, so that the cross tool slide 16 is rapidly retracted by the high-speed rotation of the cam drum shaft 62.

In the high speed range (the range of $\theta°$), an index rotation of carrier 11 of 60° is performed via the revolving arm 71, the index disk 75, the index drive gear 76, and the index gear 77 as described above. In the high speed range $\theta°$, the action of revolving arm 71 is completed within 90° of $\theta°$, and the circular portion of the cam 69 is in contact with the cam roller 67, the cutting feed is performed; when the cam 69 moves from the long circular portion to the short circular portion, the rapid return is performed; and when the cam 69 moves from the short circular portion to the long circular portion, the rapid feed (the approach to the workpiece) is performed.

In this embodiment, $\alpha$ is set at 165°, and the necessary rotational speed is inputted through the ten-key pad on the control board in accordance with the cutting conditions. The angle $\theta$ is fixed to 195°. The rotation of this angle is performed, for example, in 1.2 seconds. The input value is stepless, and the operation time is far shorter than the time for the replacement of the change gears.

The end tool slide 18 is driven directly by the feed driving motor M1. The rapid feed, cutting feed, and rapid return of the end tool slide 18 are performed by the repetition of high-speed, low-speed, and high-speed reverse operations of the motor M1, whereby the workpiece W is machined by the tool 19.

The rotation of the spindle 13 holding the workpiece W is performed by the driving power of the main shaft driving motor M3 via the pulley shaft 31, the driving shaft 12, and the meshing of gears as described above. If the cutting conditions are determined, the rotational speed of the spindles 13 is constant without switching between high and low speeds. Therefore, the motor M3 may be an inverter motor which can change the speed by the frequency change; an expensive motor such as a servo motor is not needed.

Since the motors M1, M2 and M3 are installed for respective driving systems, a shaft for transmitting the power does not traverse between the gearbox 101 and the headstock 102. Therefore, chips produced during cutting operation can easily be removed.

We claim:

1. In a multispindle automatic lathe including a headstock, a spindle carrier rotatably mounted for indexing around an indexing axis in relation to said headstock, a plurality of spindles rotatably mounted on said spindle carrier for rotation about respective spindle axes in circumferential spaced relationship around said indexing axis of said spindle carrier for supporting a workpiece on each spindle, a cross tool slide for each spindle mounted in circumferential spaced relationship in proximity to the periphery of said spindle carrier for reciprocating movement in a direction substantially transverse to a respective one of said spindle axes for supporting and moving a tool between a machining position for machining a respective workpiece and a retracted position displaced from said workpiece, and an end tool slide for each spindle supported and adapted for reciprocating movement in a direction substantially parallel to a respective one of said spindle axes for supporting a tool for machining a respective workpiece, the improvement comprising:

a spindle driving transmission system operatively connected to said spindles for driving said spindles and having a main shaft;

a first drive motor means connected to said spindle driving transmission system for driving said spindle driving transmission system and said spindles;

an end tool slide driving system operatively connected to said end tool slides for reciprocating said end tool slides;

a second drive motor means connected to said end tool slide driving system for operating said end tool slide driving system and reciprocating said end tool slides;

a cross tool slide driving system operatively connected to said cross tool slides for reciprocating said cross tool slides;

an indexing driving system operatively connected to said spindle carrier for rotatably indexing said spindle carrier; and a third drive motor means connected to said cross tool slide driving system and said indexing driving system for reciprocating said cross tool slides and indexing said spindle carrier, so that during a low speed operation of said third drive motor means for a predetermined first period said cross tool slides are reciprocated in said transverse direction towards said spindle axes in said machining position and during a high speed operation of said third drive motor means for a predetermined second period said cross tool slides are reciprocated in said transverse direction in sequence towards said retracted position and towards said machining position and said spindle carrier is rotated a predetermined index angle to position said spindles for subsequent operations on workpieces held in said spindles.

2. The lathe as claimed in claim 1 wherein said cross tool slide driving system comprises:

a cam drum shaft means rotatably mounted on said headstock;

first gear means operatively connecting said cam drum shaft to said third drive motor means;

a cross tool slide cam shaft for each cross tool slide rotatably mounted on said headstock;

second gear means operatively connecting said cam drum shaft means to each cross tool slide cam shaft;

cam means non-rotatably mounted on each cross tool slide cam shaft and having a cam shaft; and cam roller means on each cross tool slide operatively engaging the respective cam surface on a respective cam means so that rotation of said cam drum shaft by said third drive motor means at said low and high speed rotates said cross tool slide cam shafts and said cam means at corresponding low and high speeds to reciprocate said cross tool slides.

3. The lathe as claimed in claim 2 wherein said indexing driving system comprises:

an index arm non-rotatably mounted on said cam drum shaft means;

an index drive gear rotatably mounted on an intermediate shaft;

index gear means on said spindle carrier operatively engaging said index drive gear for rotating said spindle carrier by rotation of said index drive gear; and index cam means interengaging said index arm with said index drive gear, so that rotation of said cam drum shaft means rotates said index drive gear a predetermined angle for rotating said spindle carrier said predetermined index angle in synchronization with operation of said cross tool slides.

4. The lathe as claimed in claim 1 and further comprising:

means for controlling the operation of said third motor means to produce said low and high speeds in timed sequence.

5. The lathe as claimed in claim 2 and further comprising:

means for controlling the operation of said third motor means to produce said low and high speeds in timed sequence.

6. The lathe as claimed in claim 3 and further comprising:

means for controlling the operation of said third motor means to produce said low and high speeds in timed sequence.

* * * * *